US009858735B2

(12) United States Patent
Spahl et al.

(10) Patent No.: US 9,858,735 B2
(45) Date of Patent: Jan. 2, 2018

(54) USER PROXIMITY DETECTION FOR ACTIVATING VEHICLE CONVENIENCE FUNCTIONS

(71) Applicant: FORD GLOBAL TECHNOLOGIES, LLC, Dearborn, MI (US)

(72) Inventors: Robert Spahl, Cologne (DE); John R. Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 429 days.

(21) Appl. No.: 14/101,573

(22) Filed: Dec. 10, 2013

(65) Prior Publication Data

US 2015/0161834 A1   Jun. 11, 2015

(51) Int. Cl.
*G07C 9/00* (2006.01)
*H04W 4/00* (2009.01)
*H04W 4/02* (2009.01)
*H04W 52/02* (2009.01)

(52) U.S. Cl.
CPC ...... *G07C 9/00111* (2013.01); *G07C 9/00309* (2013.01); *H04W 4/008* (2013.01); *H04W 4/021* (2013.01); *H04W 52/02* (2013.01); *G07C 2209/63* (2013.01); *Y02B 60/50* (2013.01)

(58) Field of Classification Search
CPC G07C 9/00309; G07C 2209/63; G07C 5/085; G08G 1/166
See application file for complete search history.

(56) References Cited

U.S. PATENT DOCUMENTS

| 6,677,851 | B1 | 1/2004 | Losey | |
|---|---|---|---|---|
| 7,868,750 | B2 | 1/2011 | Miller et al. | |
| 8,731,475 | B1* | 5/2014 | Youngs | G10L 25/51 |
| | | | | 455/220 |
| 2005/0190041 | A1* | 9/2005 | Sahai | B60R 25/1003 |
| | | | | 340/5.72 |

(Continued)

OTHER PUBLICATIONS

Paul Lepek, et al., RF Design Considerations for Passive Entry Systems, Atmel Automotive Compilation, vol. 6, pp. 20-25.

*Primary Examiner* — James Yang
(74) *Attorney, Agent, or Firm* — Frank A. MacKenzie; MacMillan, Sobanski & Todd, LLC (57) ABSTRACT

A convenience controller activates a small zone high location precision welcoming detecting function (with high current utilization) in response to a detected arrival of an authorized user into a larger zone low location precision welcoming detecting function (with low current utilization) approach region around a vehicle. A short range transmitter broadcasts a polling signal covering the region. The short range transmitter has an approach pending mode wherein the polling signal is broadcast according to a first predetermined repetition and a baseline mode wherein the polling signal is broadcast according to a lower repetition. The short range transmitter has a first power drain in the approach pending mode. A wireless communication system is configured to monitor for user activity outside the approach region corresponding to a potential user entry into the approach region, wherein monitoring by the wireless communication system has a lower power drain. If the short range transmitter is in the baseline mode when the user activity is detected, then the short range transmitter switches to the approach pending mode.

18 Claims, 3 Drawing Sheets

(56) References Cited

U.S. PATENT DOCUMENTS

2007/0200672 A1\* 8/2007 McBride ............... B60R 25/245
 340/5.72
2009/0243795 A1 10/2009 Ghabra et al.
2009/0261945 A1 10/2009 Ko et al.
2012/0158244 A1 6/2012 Talty et al.
2013/0040620 A1 2/2013 Van Wiemeersch et al.
2013/0073349 A1\* 3/2013 Kolling ................. G07B 15/02
 705/13

\* cited by examiner

USER PROXIMITY DETECTION FOR ACTIVATING VEHICLE CONVENIENCE FUNCTIONS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to motor vehicle entry and security systems, and, more specifically, to activation of a welcoming function such as courtesy lighting when a user approaches a vehicle.

The use of various different types of wireless technologies has made many advanced remote-control and security functions available for users of motor vehicles. In a remote keyless entry (RKE) system, for example, a portable key fob carried by the user includes a button-activated transmitter for sending commands to a vehicle-mounted receiver for unlocking doors, starting of the vehicle engine, and other functions. Remote entry and remote start systems typically operate in the UHF frequency band and provide a significant range, typically up to several tens of meters for standard systems, and for higher end systems, typically up to 150 meters.

In contrast with RKE systems which require a user to press a button on a key fob, passive systems have been developed wherein no direct user interaction with the remote device is necessary. In response to detecting a manipulation of the vehicle by the user, or entering a certain zone around the vehicle, the vehicle runs a check for the presence of the key fob or other wireless device in the user's possession in order to validate the user's identity. In the case of passive entry, when the user touches a door handle of a locked vehicle, the vehicle activates a short range, low frequency (LF) transmitter to send an LF challenge signal in the area around the door. Some OEMs may activate the short range challenge when the key fob is detected in a specified zone around the vehicle. The LF challenge signal is detected by the user's remote device which then wakes up and sends an authentication signal to the vehicle (typically using a UHF channel, but other communication channels can also be used). For passive engine start, a start button provided in the vehicle interior is pressed by the user in order to initiate a similar LF challenge and UHF response detection and authentication that the user's portable device is in the area of the driver seat. In this way, use of a mechanical key and the need for manual activation of fob buttons by the user can be eliminated for daily use and reserved just as a back-up. For maximum convenience, the passive entry/passive start functions may be integrated in an RKE fob, thereby providing great convenience and flexibility of use.

Another wireless technology being increasingly adopted in motor vehicles involves the installation of a cellular phone modem. Voice and data communications over the cellular telephone system allow various services such as remote unlocking, vehicle location, navigation assistance, and many other functions. Smart phone applications are being developed allowing a mobile phone device to be used to remotely control various systems in a vehicle.

Modern vehicles are also being made with various types of wireless networking capabilities, such as Bluetooth, Bluetooth Low Energy, and WiFi networks allowing a vehicle to interact with various other electronic devices carried by a user such as a smart phone, tablet, netbook, or a media player.

When an unattended vehicle is left in a parked condition, any active electronic systems create a battery drain that could eventually result in insufficient energy to start the vehicle engine when the user returns. Therefore, the quiescent current used by any active systems must be low. The manufacturer typically sets a maximum key-off load (KOL) for a particular vehicle design in order to avoid battery drain issues for a minimum period of 30 days after receipt by a customer, but sometimes up to 60 days for certain customer segments.

For some wireless communication systems such as an RKE receiver and a cellular modem, sufficiently low quiescent currents are achievable. For other systems such as LF-based passive entry systems, Bluetooth systems, and WiFi systems, power consumption is too high to allow any significant operation times when the engine is not running. Because of these power management issues, passive entry systems typically do not scan for the presence of a user until the occurrence of a user initiated action such as touching a door handle. This allows the passive entry feature to be available for the full 30 day period.

A highly desired convenience feature associated with unlocking and/or entry into a vehicle is comprised of a welcoming function which "greets" the user. The welcoming function typically includes the activation of vehicle interior and exterior lighting including puddle lights, front and rear running lamps, cabin courtesy lights, and the playing of a sound such as a horn chirp. The welcoming function may also include adjustment of various personalization features in the vehicle such as the automatic placement of power seats so that the vehicle is ready and completely personalized for the approaching user upon entry to the vehicle. In conventional systems, however, the welcoming function is typically only initiated once a user activity has been detected such as pressing an unlock button on the key fob or touching the door handle during passive entry. It would be desirable to initiate a welcoming function as a result of the user merely approaching within a short distance of the vehicle without requiring a button press or an interaction with the vehicle. For example, if not initiated until the user has touched a door handle, a seat movement into a corresponding personalization position may not be completed by the time the user wishes to enter the seat. In addition, there are personal security benefits to the user from the activation of exterior and interior lighting prior to the moment that the door handle is contacted. On the other hand, activation of the welcoming functions at too great of a range may result in false activations when the user is nearby but is not in fact approaching or about to use the vehicle.

One possible approach would be to detect user presence within a short range of the vehicle without requiring touching of the vehicle by continuously operating the LF transmitter of a passive entry/passive start (PEPS) system. Since localization of the user to a particular door or trunk area would not be required, a specific antenna and power configuration of the LF transmitter would be provided to create a desired detection region around the vehicle (such as an area within about 3 to 5 meters). Although the welcoming function could then be activated in the appropriate circumstances, the battery drain resulting from excessive LF transmitter operation is prohibitive. The action of continuously checking for the approach of the user and their remote device, result in high vehicle battery power consumption which cannot be allowed for the full 30 days of target parking life. As such, this method of proximity detection typically only allows the detection feature to be active for around 5 to 10 days from the last drive cycle.

Another possibility for welcoming function activation would be to provide communication between the vehicle and a smart phone carried by the user, so that the relative positions between the vehicle and the user/phone can be detected and analyzed. For example, the vehicle parked position could be obtained from a GPS receiver in the vehicle or in the phone at the vehicle key-off event which is then stored by the phone. After exiting the vehicle, the phone could monitor the relative distance between the vehicle and phone to detect whether the user has moved away and then returned within a predetermined distance of the vehicle, at which point the phone would initiate communication with the vehicle. Although vehicle battery drain would be acceptable in this method, the battery usage by the phone would be higher and the combination of phone communication and GPS positioning would be unreliable and not achieve the desired performance. For example, GPS signals are not receivable in all areas, such as parking structures, or accurately in areas with tall buildings. In addition, once a smart phone has detected that the user has moved into a position requiring activation of the welcoming function, the time delay or latency involved in establishing a cellular connection from the phone to the vehicle may introduce a lag that defeats operation of the welcoming function. Further, the tolerances of GPS (typically 3 to 6 meters) relative to both the position of the phone and the position of the vehicle, create a large error zone where activation may be initiated by overlap of the GPS zones but not truly intended by the user. This may result in excessive unwanted wake-up of the vehicle resulting in higher vehicle battery power consumption and frustration by the user due to vehicle illumination without an intended or deliberate request.

Short range wireless networks such as Bluetooth and WiFi networks are also not a good choice for initiating a welcoming function. A typical operating range for Bluetooth and WiFi would typically be too large for use in detecting entry into a small detection region around the vehicle. Moreover, battery drain from either Bluetooth or WiFi hardware would exceed KOL limits Use of Bluetooth Low Energy could reduce the vehicle side power consumption for the Bluetooth LE transceiver; however, less than a majority of phones have or may have Bluetooth LE for the foreseeable future making it difficult to build a strategy around Bluetooth LE.

SUMMARY OF THE INVENTION

The present invention achieves passive proximity detection for an approaching vehicle user within an appropriate activation range without any significant increase in overall average battery drain. A short-range, high-power proximity detector is normally off or is operating at a very slow scanning or repetition rate. Various remote device user activities are monitored to detect an increased potential for the user to approach the vehicle and to correspondingly increase the repetition rate for the short-range detector (at least for a certain length of time).

In one aspect of the invention, a vehicle apparatus includes a convenience controller activating a user welcoming function in response to a detected arrival of an authorized user remote device of a vehicle into an approach region around the vehicle. A short range transmitter broadcasts a polling signal covering the approach region. The short range transmitter has an approach pending mode wherein the polling signal is broadcast according to a first predetermined repetition and a baseline mode wherein the polling signal is broadcast according to a second predetermined repetition which is slower than the first predetermined repetition. When the short range transmitter operates in the approach pending mode, it has a first higher level power drain resulting from a faster scanning or repetition rate. A wireless communication system is configured to monitor for user activity outside the approach region and to anticipate or predict a potential entry into the approach region, wherein monitoring by the wireless communication system has a second lower power drain less than the first power drain. If the short range transmitter is in the baseline mode when the user activity is detected, then the short range transmitter switches to the approach pending mode.

DETAILED DESCRIPTION OF PREFERRED EMBODIMENTS

In one fundamental feature of this invention, an "Approach Pending" mode can be triggered directly by a manual user command being sent to the vehicle that indicates they plan to approach the vehicle shortly and/or triggered indirectly by an automatic method that infers a possible upcoming use of the vehicle based on actions with or movement of other wireless devices such as a smart phone. The direct manual user command may be a dedicated approach pending button or the approach pending function may be tied and triggered by associated button functions such as Remote Start or Car Finder features.

Since approach triggers derived from a smart phone or other device are used only to activate (or otherwise increase the use of) the short-range LF scanning in an attempt to detect user proximity, the advantages of LF scanning are still obtained while reducing the incremental vehicle battery current draw to acceptable levels. Thus, only when a coarser detection method with a lower current draw indicates that the user may be in range does the more accurate method, having a higher current draw, initiate proximity scanning at a significant level.

In one embodiment, the approach pending mode is triggered by a deliberate key fob button action, e.g., a remote start command. Similarly, a user's mobile device (e.g., key fob or phone) may have the ability to send a command to precondition the interior temperature of a vehicle which can also be used to predict a likelihood of imminent vehicle use. A vehicle control system could learn usage patterns of these functions (e.g., the user tends to command a preconditioning of the vehicle about 10 minutes before entering the vehicle) and defer short range scanning until that time. In addition, a graduated approach with stepped increases in the repetition rate of the short-range scanning as the expected arrival nears can be used.

In another embodiment, the approach pending mode can be triggered in response to pre-programmed time windows. Where either the vehicle or a remote device such as a smart phone possesses a calendar function, the calendar information can identify likely driving trips or can be specifically configured with a pre-established window for activating the approach pending mode. Furthermore, a smart calendar could learn to correlate certain calendar location fields (e.g., at work or that an empty calendar time may identify "home"), and thus deduce that a driving trip is likely to occur just prior to a meeting entry with a different corresponding location. Using known pattern recognition methods, a smart calendar can learn which locations are likely to result in vehicle use and how long prior to the calendar entry time the travel begins.

In yet other embodiments, a cellular phone or other portable electronic device with a wireless communication capability (e.g., cellular data connection, Bluetooth, Bluetooth LE, or WiFi) monitors a user's activity to generate a trigger for entering the approach pending mode. For example, a mobile communication device such as a smart phone may have the ability to lock/unlock the user's home door (e.g., using Near Field Communication or Bluetooth), and the action of locking the home's entry door from the exterior of the home generates the trigger. By using an adaptive learning process, the mobile device can learn how the locking of the home door relates to car driving and then adjusts the timing of the trigger based on this.

Some users may switch operating modes of their mobile device (e.g., by touching it to an NFC tag) when exiting their home. This may also be used as a trigger.

For a vehicle with personalization options, a remote control such as a smart-phone application could be provided for remotely initiating adjustment of the options. Thus, the user could "ready" the vehicle by manual input on the mobile communication device using a touchscreen, voice recognition, or contact with an NFC tag. These activities can also be used to generate the trigger for the approach pending mode.

A trigger based on the relative locations of the vehicle and user can also be used. If the smart phone or other mobile communication device is able to track its position and the vehicle is able to track its position (e.g., via GPS), then the vehicle can send its location via a GSM module or other cellular link at each ignition off (or other relevant indication) to the smart phone. The smart phone may also be able to record the vehicle's GPS location in response to other events, such as by noting the phone's current location when the vehicle engine is turned off or the phone unpairs from a Bluetooth connection with the vehicle. Later, the smart phone can detect if it is approaching the vehicle by comparing a current position with the stored position. To avoid repetitive trigger generation when the user is spending time close to the vehicle (e.g., when the vehicle is parked in front of the user's home or workplace), then the approach pending mode should only be triggered once after the user reaches a predetermined minimum distance and would then expire after a certain time period if they do not arrive (e.g., 10 minutes). In one refinement, the mobile phone device with GPS can calculate the walking speed of the user, and based on the calculated speed the device can determine the distance from the vehicle at which it needs to send the trigger signal so that the vehicle will have sufficient time for any personalization/customization features to be adjusted.

To prevent customer confusion in case the vehicle sometimes does not provide the expected welcoming function, the activation state of the approach pending mode is preferably displayed to the user. The activation state can be displayed on the communication device (e.g., in the status line of a smart phone) and/or on the vehicle (e.g., by activating a low-power light).

The vehicle controller can learn its "home" position (e.g., where it is parked overnight) and its "work" position (e.g., where it is parked for longer hours on work days) and then adjust the interpretation of various inputs accordingly.

After the approach pending mode has been trigger, the vehicle can use one of several different short-range wireless technologies to detect an actual close approach of the user. For example, a short-range, LF scanning system of an PEPS system can be configured to interrogate an approach region at a faster rate than when not in approach pending mode. An additional antenna array and/or modified power levels for sending out a polling signal may be needed in order to adjust the range and/or shape of the approach region being covered around the vehicle. Alternatively, polling/interrogation could perform scans for a button press on a 2-way UHF remote key fob (e.g., operating at 868 MHz in Europe and 902 MHz in the US, which may give a range of about 100 meters). In another example, a Bluetooth or WiFi connection between a vehicle entertainment/navigation system (e.g., the Ford Sync® system) and a mobile smart phone can be used to detect the actual approach. However, Bluetooth and WiFi may have an undesirably large reception range (e.g., more than about 10 meters for Bluetooth and 30 meters for WiFi). The signal strength measured by the vehicle could be used to estimate the user's distance from the vehicle, e.g., a WiFi access point first detects the approaching mobile communication device at a 30 meter range with a weak signal and then waits for a stronger signal until the mobile communication device is at 10 m range before activating the welcoming function of the courtesy mode. This will provide the beneficial effect that the vehicle identifies an approach earlier when the user is in a clear line of sight than when hidden behind a corner. Consistent with common user expectations, the car may in this case light up earlier when in a direct line of sight, but not until you turn a corner when the car is not initially in sight.

Figure 1:
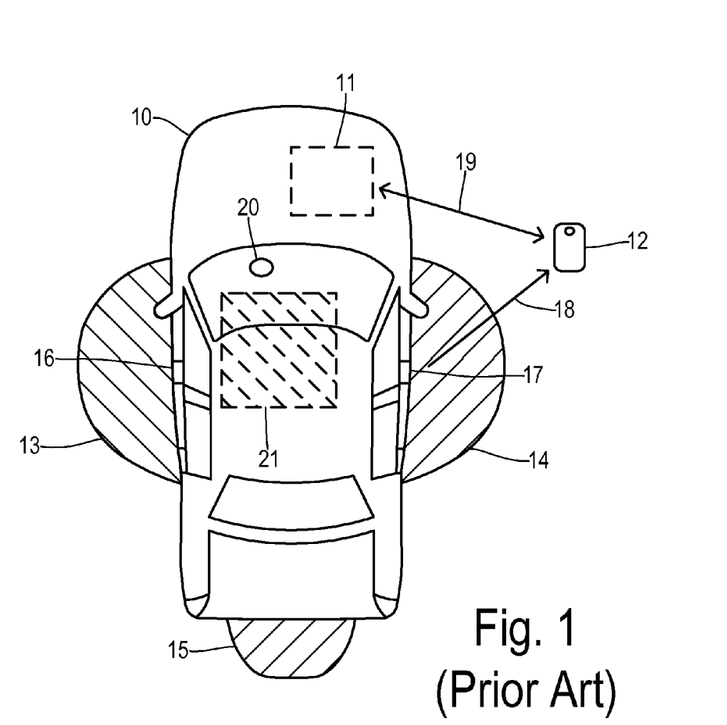
FIG. 1 is a diagram showing a vehicle and the detection regions for a passive entry/passive start system.

Referring now to FIG. 1, a vehicle 10 has a passive entry/passive start (PEPS) module 11. A user carries a wireless device 12 such as a passive key fob or card device, for example. In the conventional passive entry function, module 11 drives a plurality of antennas, not shown, for sending a low frequency polling signal to create interrogation regions 13 and 14 at the vehicle entry doors and a region 15 adjacent to a vehicle trunk opening. Poling zones at the hood may also be employed. In the typical conventional system, interrogation fields 13-15 are only activated when vehicle 10 senses that a user activity is taking place, such as a user grasping a door handle 16 or 17 with intent to gain access to the vehicle. The polling signal preferably includes an LF broadcast signal 18 which may be received by device 12. Reception of the polling signal wakes up device 12 which then uses a separate UHF communication channel 19 to respond back to the vehicle to validate its identity with PEPS module 11. Module 11 can then unlock the corresponding door(s) if the user signal is validated.

Once inside the vehicle, the passive start function is initiated by the user by pressing an engine start button 20 in the vehicle interior. The PEPS system also includes antennas (not shown) used to create an interrogation zone 21 coincident with the driver's seat or an OEM specific zone within the cabin. If a valid wireless device is found in this define cabin zone, then the vehicle engine is started.

Figure 2:
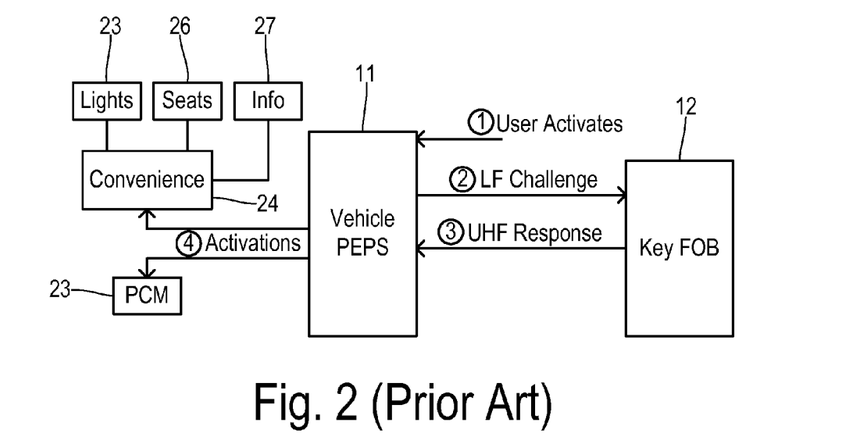
FIG. 2 is a block diagram showing components of a passive activation system.

FIG. 2 shows some conventional vehicle components in greater detail together with a sequence of operations for a passive entry system. In a first action, the user activates the vehicle PEPS controller 11 by touching a door handle, trunk handle, or engine start button, for example. Vehicle PEPS controller 11 then generates a short-range, low frequency interrogation/polling signal which is broadcast into the appropriate area in an attempt to detect the presence of key fob 12. The interrogation/polling signal may preferably include challenge data as part of an authentication process known in the art. Using the challenge signal, key fob 12 generates a UHF response signal which is broadcast back to vehicle PEPS controller 11 as known in the art. If the UHF response properly validates the identity of the user with key fob 12, then the process continues with the activations of appropriate vehicle systems according to the user action that initiated the authentication. For example, vehicle PEPS controller 11 may be coupled to the powertrain control module (PCM) 23 for executing an engine start-up if the original user action was the pressing of an ignition ON button. Other types of activations can include the unlocking of one or more doors or a trunk lid (not shown).

Vehicle PEPS controller 11 is further coupled to a convenience controller 24 for performing a welcoming function. When a door unlocking task is being performed, convenience controller 24 commands interior and/or exterior lights 25 to illuminate as part of the welcoming function. Convenience controller 24 is further connected to customizable elements of the vehicle including power seats 26 and an information/entertainment system 27. Thus, the welcoming function may use the validated identity of the user entering the vehicle for automatically making corresponding settings for the seat positions, radio preset configurations, and power mirror settings, for example.

The welcoming functions of FIG. 2 occur, in a conventional system, only after the user has already approached and has touched the vehicle. It would be desirable to initiate the welcoming function sooner without requiring any overt action by the user specifically intended by the user for engaging the welcoming function (i.e., it is preferred that the welcoming occurs automatically).

Figure 3:
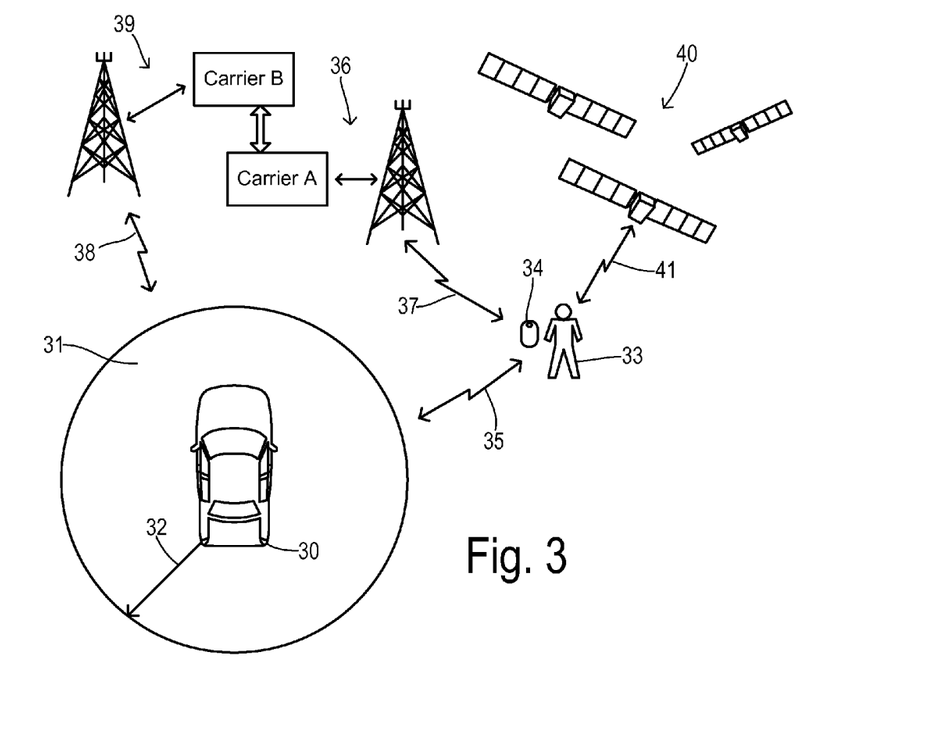
FIG. 3 is a diagram depicting a vehicle, a user, and several wireless communications systems that are used in various embodiments of the present invention.

One preferred embodiment of the invention operates as shown in FIG. 3 wherein a vehicle 30 has a surrounding approach region 31, which for simplicity, is defined here by a radius 32 according to a desired range of operation for the welcoming function. Generally, for passive entry technology, the approach zone is defined by oblong overlapping detection zone lobes extending out from the LF antennas. However, for wireless technologies such as Bluetooth, WiFi, or GPS coordinates, the detection zone will be more circular. A user 33 carries a wireless device 34 capable of wirelessly interacting with vehicle 30 according to one or more wireless communication technologies. In addition to the short-range, low frequency communication described above, wireless device 34 may communicate with vehicle 30 over a UHF one-way or two-way communication link 35. Indirect wireless communication may be established using a cellular telephone system 36 with a first data link 37 between device 34 and cellular infrastructure 36 (of a Carrier A) and a second wireless link 38 between cellular infrastructure 39 (of a Carrier B) and a cellular modem in vehicle 30, for example. Wireless device 34 may further include a GPS receiver capable of receiving down-linked GPS signals 41 from a plurality of GPS satellites 40.

Approach region 31 has an effective size determined by an antenna configuration and power levels of a short range transmitter on vehicle 30 (not shown) which broadcasts a polling signal covering region 31. The short range transmitter has a baseline mode wherein the polling signal is broadcast according to a low repetition rate. The low rate may preferably be a zero rate (i.e., the short range transmitter may be turned off). The baseline mode is used for most of the time in order to ensure a low key-off load current. The short range transmitter also has an approach pending mode wherein the polling signal is broadcast according to an increased repetition rate (i.e., greater than the baseline rate) resulting in a higher power drain.

The approach pending mode is entered only after another wireless communication system detects a user activity outside the approach region which corresponds to a potential entry into the approach region. Monitoring for user activity outside the approach region by the wireless communication system is associated with a lower power drain to ensure that the key-off load is maintained at an acceptable level. The user activity that may trigger the switch to the approach pending mode may be detected as a user button activation in an RKE system using UHF channel 35 or a Telematics-based key fob application on the phone that would transmit the same RKE virtual button activation via path 37 through 38. Alternatively, the user action may involve a particular use of a cellular smart phone or particular movements of the smart phone as determined using GPS localization, for example. In this case, device 34 may also notify the vehicle via path 37 through 38. Alternatively, device 34 may also notify the vehicle by direct communication from device 34 to a receiver on the vehicle such as a Bluetooth Low Energy transceiver to request entry into an Approach Pending mode.

Figure 4:
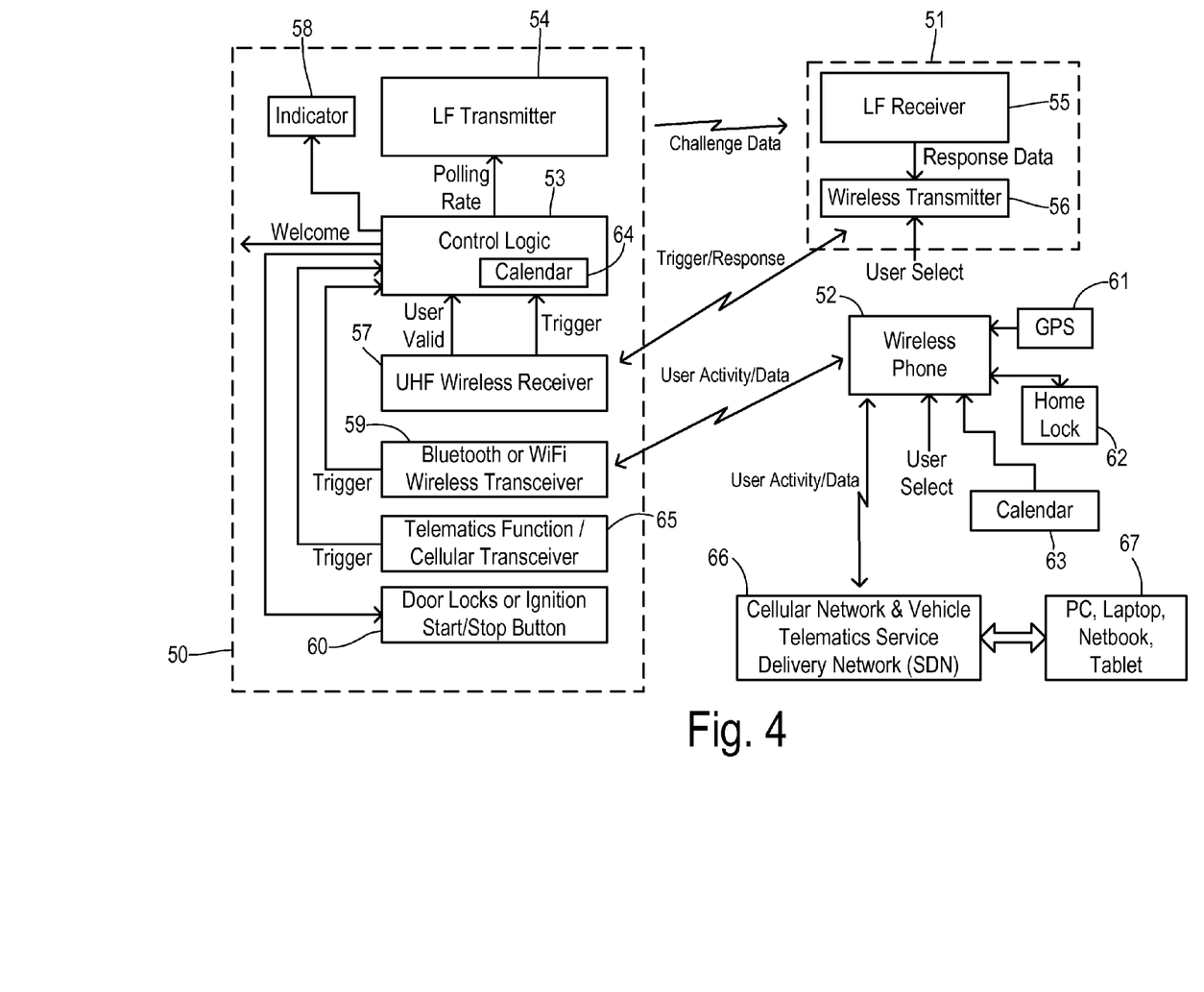
FIG. 4 is a schematic, block diagram showing the invention in greater detail.

FIG. 4 shows some preferred embodiments of the invention in greater detail. A vehicle apparatus 50 is associated with an authorized user who carries at least one wireless device 51 which is shown in this embodiment as a passive entry key fob. The user may carry additional wireless devices, such as a wireless phone 52.

Vehicle apparatus 50 includes a short range transmitter 54 which, in a preferred embodiment, may be comprised of an LF transmitter associated with a conventional type of passive entry system. A control logic block 53 may be comprised of a dedicated microcontroller or may be implemented in various electronic modules within the vehicle. Logic block 53 is connected with LF transmitter 54 to provide a polling rate command to transmitter 54. Key fob 51 includes a low frequency receiver 55 configured to receive the polling signals from transmitter 54 in a known manner. A typical polling signal includes challenge data unique to vehicle 50 which is processed by receiver 55 to generate response data. The response data is transmitted back to the vehicle via a wireless transmitter 56 in order to authenticate the user. Wireless transmitter 56 may comprise a UHF channel which can be present in key fob 51 for performing conventional RKE functions. Transmitter 56 returns the response data to a wireless receiver 57 in vehicle apparatus 50. Receiver 57 checks for valid response data and informs control logic 53 of the result. According to the conventional passive entry function, valid authentication of the user results in an activation signal being provided to door locks or ignition start/stop switch 60 according to the localization of key fob 51 (i.e., based on the relative strengths of the signals received at different antenna elements). When operating in either the baseline mode or the approach pending mode for the welcoming function, the detection of valid response data from an authorized user causes control logic 53 to initiate the welcome function. During times that the approach pending mode is active, control logic 53 activates an indicator 58 within vehicle apparatus 50 so that a user can visually verify whether they should have been recognized for purposes of initiating the welcoming function.

When operating in the baseline mode with the vehicle unattended and awaiting arrival of the user in order to initiate the welcoming function, a transition into the approach pending mode can be initiated in response to either key fob 51 or wireless phone 52 according to many different potential scenarios. For example, key fob 51 may be responsive to a manual user select signal (e.g., depressing a button that initiates a remote engine start signal). When a corresponding command signal is broadcast by wireless transmitter 56 to wireless receiver 57 so that an engine start is performed, the command signal also operates as a trigger which is forwarded by wireless receiver 57 to control logic 53 for initiating the approach pending mode. As a result, control logic 53 increases the polling rate of transmitter 54.

Short range transmitter 54 is shown in FIG. 4 as an LF transmitter. Alternatively, a short range transmitter could be comprised of either a Bluetooth node or WiFi node or hotspot 59 as are commonly being incorporated into vehicles.

When wireless phone 52 is available and properly configured, user activity and/or data may be received by a wireless transceiver (or modem) 65 for purposes of generating a trigger to be provided to control logic 53 in certain alternative embodiments. The wireless communication system between phone 52 and wireless transceiver 65 may be comprised of a cellular data connection via a third party cellular network, or may be comprised of other direct networking connections.

Many different user activities involving wireless phone 52 can be employed for generating a trigger. For example, wireless phone 52 may include a GPS receiver 61 so that position monitoring can be used to generate the trigger. Thus, whenever wireless phone 52 detects movement of the phone into an approach region around a previously stored position for the vehicle, phone 52 may send a data message directly to wireless transceiver 59, or via the cellular networks to wireless receiver 65, identifying the potential entry of the user so that the higher repetition rate for the polling signal can be initiated in the approach pending mode. Preferably, the trigger distance monitored by the phone may be greater than the approach region so that the system may compensate for any latency in the detection of the approach using GPS or the delays in establishing a cellular call to announce the occurrence of the trigger.

The activity involving wireless phone 52 can be related to user control of another device outside the vehicle such as a home security system 62. Thus, when the user performs a locking or alarm setting function of their home using an application or special transponder on phone 52, a corresponding message is generated by phone 52 and sent to wireless transceiver 59 or 65 indicating that the user is leaving their home and may be about to use the vehicle. As described earlier, control logic 53 may learn to associate the home locking action or other similar activities of the user using wireless phone 52 with a subsequent approach to and use of the vehicle.

Wireless phone 52 may also have an associated calendar 63 which may have explicit or implicit data that indicates times that the user may be expected to approach their vehicle. Likewise, control logic 53 may also include a calendar 64 within vehicle apparatus 50 that may result from either adaptive learning of user activities or intentionally configured by the user.

According to another possibility, wireless phone 52 may include a remote control application responsive to a manual user selection to communicate with vehicle apparatus 50 for various functions such as preconditioning of vehicle temperature or remote engine start, either of which can be used to generate corresponding triggers.

According to yet another possibility, the approach pending trigger may be initiated by other devices 67 such as a desktop PC, tablet, or notebook. These devices 67 would interface to a Service Delivery Network (SDN) 66 that may accept commands received by these devices over the internet and then retransmit the command over the cellular network to receiver 65.

Figure 5:
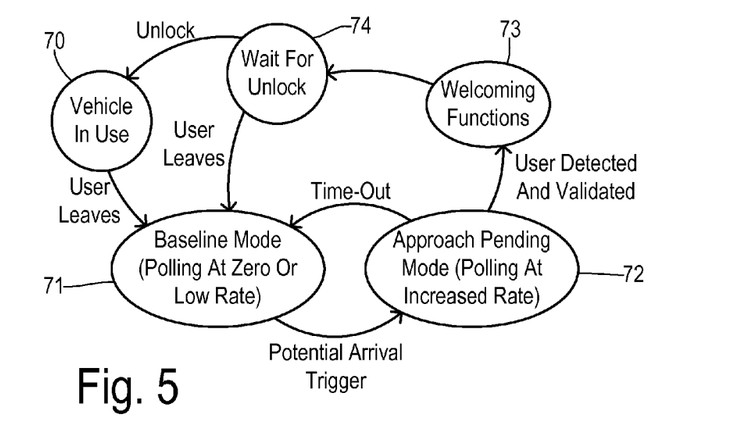
FIG. 5 is a state diagram showing operation of a preferred embodiment of the invention.

Overall operation of the invention is shown by a state diagram of FIG. 5. In a state 70, the vehicle is in use. When the user parks the vehicle and subsequently leaves the area around the vehicle, a transition is made to state 71 wherein the short range transmitter begins broadcasting the polling signal in the baseline mode. Most preferably, polling begins at a zero or a low rate in order to maintain a low current draw. While operating in the baseline mode, the wireless communication system (which is characterized by a power drain less than the power drain associated with the short range transmitter) monitors for user activity outside the approach region that is suggestive of a potential entry into the approach region. When a potential arrival trigger occurs, a transition is made to state 72 wherein the short range transmitter begins broadcasting the polling signal at an increased rate in the approach pending mode. Thus, the battery power drain temporarily also increases during the time of an elevated probability of arrival of the user. The time since entering the approach pending mode is monitored and a time-out or expiration may occur after a predetermined period of time (e.g., about ten minutes). When a time-out does occur, a transition is made back to state 71 and the short range transmitter returns to the baseline mode. The repetition rate of the polling signal can return immediately to the zero or lower rate or may be decreased gradually.

In the event that a user is detected and validated while in state 72, then a transition is made to state 73 for performing the welcoming functions. Once the welcoming functions are initiated, a transition is made to a state 74 to wait for an unlock command (e.g., resulting from the authorized user touching a door handle or performing another entry action). Once the unlock occurs, a transition is made to vehicle in-use state 70.

In the event that an unlock is not received within a predetermined period of time after entering state 74 (e.g., ten minutes) or in the event that the condition leading to the occurrence of the trigger no longer exists (e.g., the user has headed away from the vehicle), then a transition is made back to baseline mode 71.

What is claimed is:

1. Vehicle apparatus comprising:
  a convenience controller activating a user welcoming function in response to a detected arrival of an authorized user of a vehicle into an approach region around the vehicle, wherein the welcoming function does not include a door unlocking function;
  a short range transmitter broadcasting a polling signal covering the approach region and having an approach pending mode wherein the polling signal is broadcast according to a first predetermined repetition and a baseline mode wherein the polling signal is broadcast according to a second predetermined repetition which is lower than the first predetermined repetition, and wherein the short range transmitter operating in the approach pending mode has a first power drain;

a short range receiver detecting a response from a first user-carried wireless device, wherein the short range receiver has a predetermined accuracy for detecting a proximity of the user-carried wireless device;

a wireless communication system configured to monitor for user activity outside the approach region when the first user-carried wireless device is outside the range of the short range transmitter, wherein the detected user activity corresponds to a potential entry into the approach region, wherein monitoring by the wireless communication system has a second power drain less than the first power drain, wherein the wireless communication system has a coarser accuracy than the predetermined accuracy for detecting the proximity of the user-carried wireless device, and wherein the wireless communication system is configured to communicate with a second user-carried wireless device with a range greater than the short range transmitter;

wherein if the short range transmitter is in the baseline mode when the user activity is detected, then the short range transmitter switches to the approach pending mode.

2. The apparatus of claim 1 wherein the short range transmitter is comprised of a low-frequency passive entry transmitter.

3. The apparatus of claim 1 wherein the short range transmitter is comprised of a Bluetooth node.

4. The apparatus of claim 1 wherein the short range transmitter is comprised of a WiFi node.

5. The apparatus of claim 1 wherein the wireless communication system is comprised of a remote keyless entry system, and wherein the user activity is comprised of a keyless entry command initiated by the user.

6. The apparatus of claim 1 wherein the wireless communication system is comprised of a remote engine start system, and wherein the user activity is comprised of a start command initiated by the user.

7. The apparatus of claim 1 wherein the wireless communication system is comprised of a cellular phone system.

8. The apparatus of claim 7 wherein the second user-carried wireless device is comprised of a cellular phone, and wherein a cellular modem in the vehicle is configured to receive a message from the cellular phone that generates the message according to conditions identifying the potential entry.

9. The apparatus of claim 8 wherein the conditions include a manually-generated command to send the message.

10. The apparatus of claim 8 wherein the conditions include GPS-monitored locations of the cellular phone and the vehicle.

11. The apparatus of claim 8 wherein the conditions include control of a device outside the vehicle that is coincident with a subsequent use of the vehicle.

12. The apparatus of claim 7 wherein a cellular modem in the vehicle is configured to receive a message from a remote computer that generates the message according to conditions identifying the potential entry.

13. The apparatus of claim 1 further comprising an indicator configured to be seen by the user while outside the vehicle which is activated during the approach pending mode.

14. The apparatus of claim 1 wherein the second predetermined repetition is comprised of the polling signal being broadcast at a rate of zero.

15. The apparatus of claim 1 wherein the user welcoming function is comprised of illuminating at least one courtesy light on the vehicle.

16. The apparatus of claim 1 wherein the user welcoming function is comprised of adjusting a user-customized vehicle accessory.

17. Vehicle apparatus comprising:

a convenience controller activating a user welcoming function in response to a detected arrival of an authorized user of a vehicle into an approach region around the vehicle, wherein the welcoming function does not include a door unlocking function;

a short range transmitter broadcasting a polling signal covering the approach region and having an approach pending mode wherein the polling signal is broadcast according to a first predetermined repetition and a baseline mode wherein the polling signal is broadcast according to a second predetermined repetition which is lower than the first predetermined repetition, and wherein the short range transmitter operating in the approach pending mode has a first power drain;

a short range receiver detecting a response from a user-carried wireless device, wherein the short range receiver has a predetermined accuracy for detecting a proximity of the user-carried wireless device;

a wireless communication system configured to monitor for user activity outside the approach region when the user-carried wireless device is outside the range of the short range transmitter, wherein the detected user activity corresponds to a potential entry into the approach region, wherein monitoring by the wireless communication system has a second power drain less than the first power drain, wherein the wireless communication system has a coarser accuracy than the predetermined accuracy for detecting the proximity of the user-carried wireless device, and wherein the user activity for indicating the potential entry further comprises monitoring a time calendar associated with the user containing calendar entries indicating likely driving trips;

wherein if the short range transmitter is in the baseline mode when the user activity is detected, then the short range transmitter switches to the approach pending mode.

18. The apparatus of claim 17 wherein the time calendar is adaptively formed by the convenience controller.

* * * * *